United States Patent [19]

Chen

[11] Patent Number: 5,383,706
[45] Date of Patent: Jan. 24, 1995

[54] ADJUSTING ASSEMBLY FOR BICYCLE SEAT

[75] Inventor: Chin-Pei Chen, Taichung Hsien, Taiwan, Prov. of China

[73] Assignee: Kalloy Industrial Co., Inc., Taiwan, Prov. of China

[21] Appl. No.: 72,476

[22] Filed: Jun. 3, 1993

[51] Int. Cl.⁶ .............................................. B62J 1/00
[52] U.S. Cl. ........................... 297/215.15; 297/195.1
[58] Field of Search ........... 297/195.1, 215.15, 215.13; 248/225.31, 291; 403/84, 24, 391

[56] References Cited

U.S. PATENT DOCUMENTS

| | | | |
|---|---|---|---|
| 3,891,333 | 6/1975 | Corderac'k | 297/215.15 X |
| 4,783,119 | 11/1988 | Moses | 403/84 X |
| 5,190,346 | 3/1993 | Ringle | 297/215.15 X |

FOREIGN PATENT DOCUMENTS 2630064  1/1978  Germany .................. 297/215.15

*Primary Examiner*—Peter R. Brown
*Assistant Examiner*—Milton Nelson, Jr.
*Attorney, Agent, or Firm*—Marshall A. Lerner

[57] ABSTRACT

A bicycle seat adjusting assembly includes a seat tube having a bore extending transversely through an upper part thereof, a balance tube received in the transverse bore with two ends thereof exposed outside the transverse bore, a mounting member adapted to hold bicycle seat supporting rods therein, having an arcuate bottom surface pivotally received in the arcuate surface in the upper end of the seat tube and two ears each with a vertical hole therein in alignment with a vertical bore in each of the exposed ends of the balance tube, a positioning block mounted on each ear and having a threaded hole in alignment with the associated vertical hole in each ear, and an adjusting bolt passing through each vertical bore and associated vertical hole to engage with the associated threaded hole. Rotation of the two adjusting bolts in opposite directions causes a change of the inclination of the bicycle seat supporting rods.

8 Claims, 4 Drawing Sheets

ADJUSTING ASSEMBLY FOR BICYCLE SEAT

BACKGROUND OF THE INVENTION

The present invention relates to an adjusting assembly for adjusting the position of the bicycle seat.

Adjustment of the bicycle seat to suit different riders is troublesome and time-consuming, and that additional tools, such as wrenches are required. The present invention provides an improved adjusting device in this regard.

SUMMARY OF THE INVENTION

The present invention provides a bicycle seat adjusting assembly which includes a seat tube having a bore extending transversely through an upper part thereof, a balance tube received in the transverse bore with two ends thereof exposed outside the transverse bore, a pivotal base having an arcuate bottom surface pivotally received in an arcuate surface formed in the upper end of the seat tube, an upper cover mounted on the pivotal base, and a positioning block mounted on the upper cover. Preferably, the thickness of a peripheral wall of the upper part of the seat tube is greater than that of a lower part of seat tube.

The upper cover and the pivotal base include aligned recesses to securely hold bicycle seat supporting rods. Preferably, the upper cover includes a groove in an underside thereof to securely receive an upper side of the pivotal base. The upper cover further includes two ears each with a vertical hole therein in alignment with a vertical bore formed in each of the exposed ends of the balance tube. The ear is recessed to retain associated positioning block.

An adjusting bolt passes through each vertical bore and associated vertical hole to engage with associated threaded hole. Preferably a bearing bowl is provided between each adjusting bolt and associated vertical bore. The bearing bowl includes a tapered surface received in the vertical bore and an annular wall on which a head of the adjusting bolt abuts.

By such an arrangement, the user may, without additional hand tools, simultaneously rotate the two adjusting bolts in opposite direction to change the inclination of the bicycle seat supporting rods which are securely held between the upper cover and the pivotal base which is pivotable along the arcuate surface in the upper end of the seat tube.

Other objects, advantages, and novel features of the invention will become more apparent from the following detailed description when taken in conjunction with the accompanying drawings.

DETAILED DESCRIPTION OF THE PREFERRED EMBODIMENTS

Figure 6:
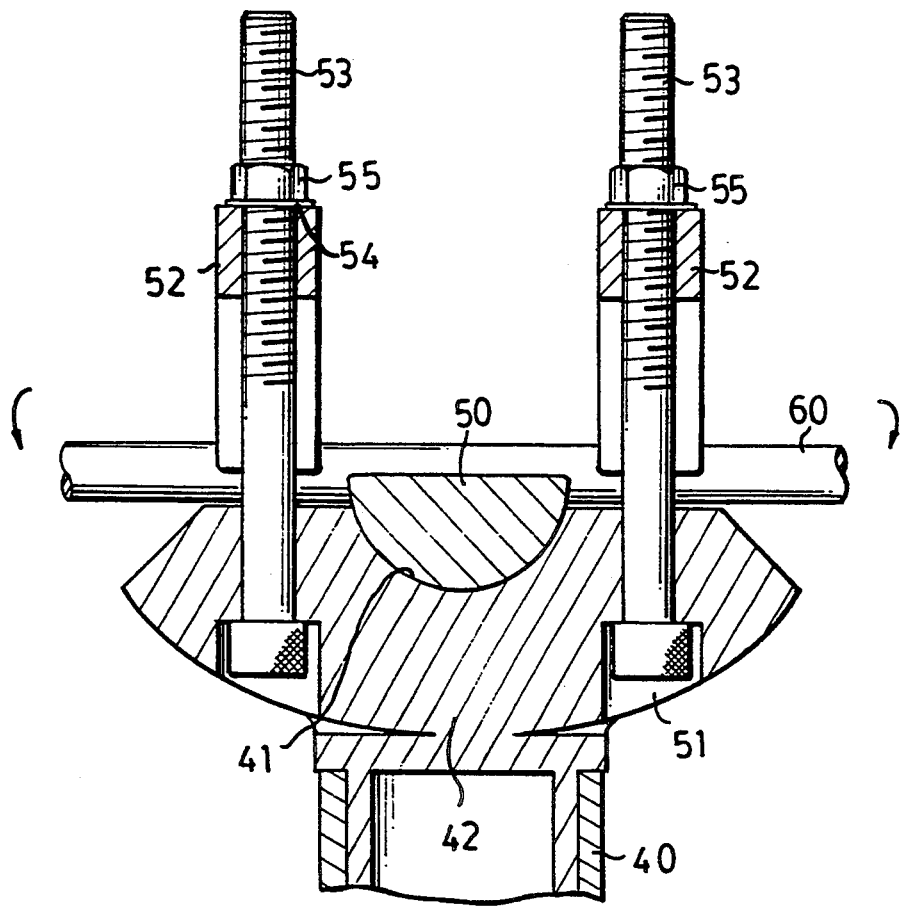
FIG. 6 is a cross-sectional view illustrating a bicycle seat adjusting device according to prior art.

For a better understanding of the present invention, reference is firstly made to FIG. 6 in which a conventional device for adjusting the position of the bicycle seat is shown. As shown in this figure, a block 42 with an upward-facing concave surface 41 is provided on the seat post (not labeled) received in the seat tube 40. A bicycle seat supporting rod 60 is securely mounted on an adjustable seat 50, which, in turn, is pivotally received in the concave surface 41, thereby being pivotable with adjustable seat 50. A pair of substantially inverted U-shaped members 52 are provided to clamp the rod 60 between the two distal ends thereof, and bolts 53, nuts 55, and washers 54 are required to retain the inverted U-shaped members 52.

In such an arrangement, when adjusting of the position of the seat (not shown), i.e., the inclination of the supporting rod 60, the user must firstly release one of the bolts 53 which reside in associated preset hole 51 in the block 42, and then screw the other bolt 53 in the other hole 51 in the block 42 to allow the pivotal movement of the supporting rod 60 and the adjusting seat 50 along the upward-facing concave surface 41 (see the arrows in FIG. 6).

It is, however, found troublesome during the angular adjustment of the seat as the nuts 55 must be released prior to the release of the bolts 53, which means that the bolts 53 and nuts 55 must be operated at least two times. Furthermore, as no positioning device is provided to the nuts 55, in order to prevent the seat tube 40 and the supporting rod 60 from becoming unstable resulting from overreleasing of the nuts 55, hand tools, such as wrenches must be used to release the nuts 55 which results in inconvenience in operation.

In view of the above problems encountered in prior art, the present invention provides an improved device in which the seat tube structure is reinforced to omit the seat post as well as the block 42 and no hand tool is required to operate the adjustment of the bicycle seat.

Figure 1:
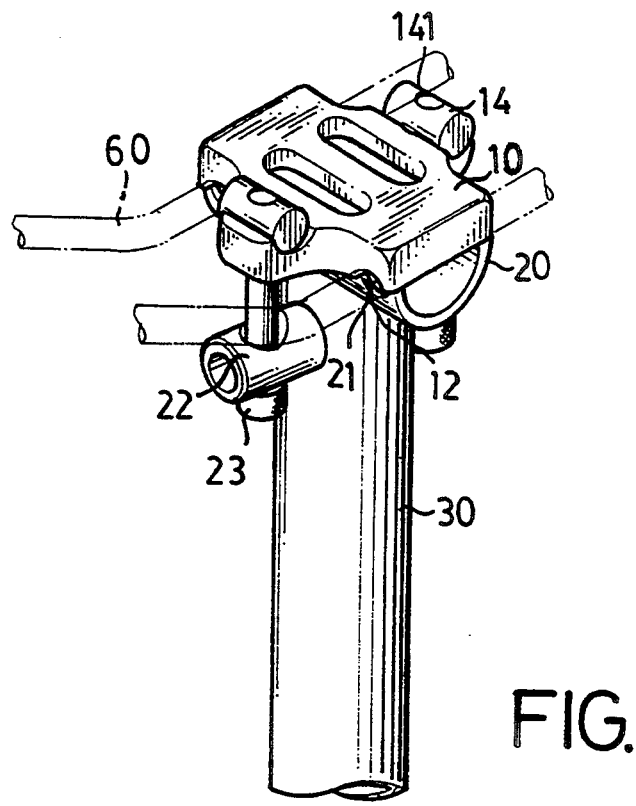
FIG. 1 is a perspective view of a bicycle seat adjusting assembly in accordance with the present invention.
Figure 2:
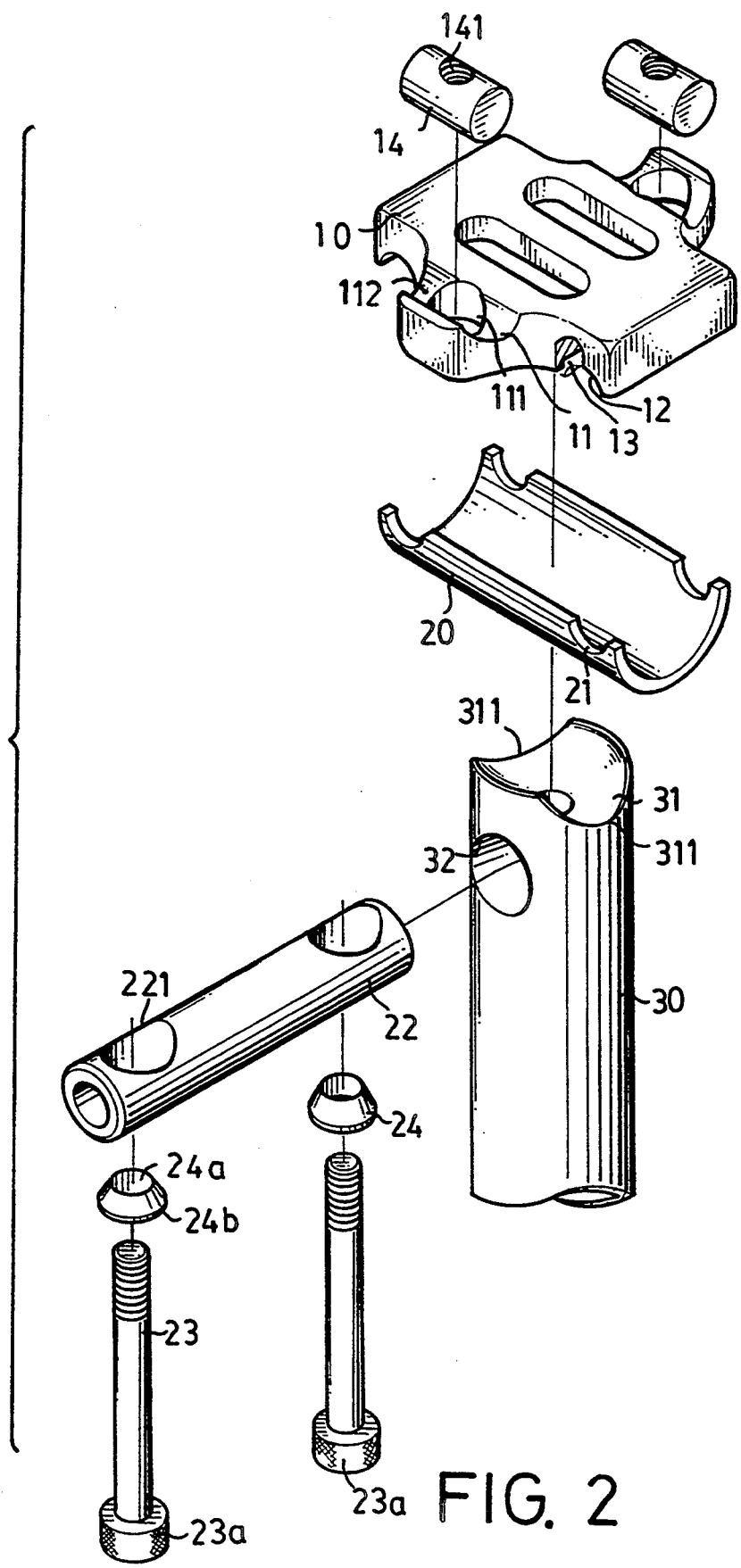
FIG. 2 is an exploded view of the bicycle seat adjusting assembly.
Figure 3:
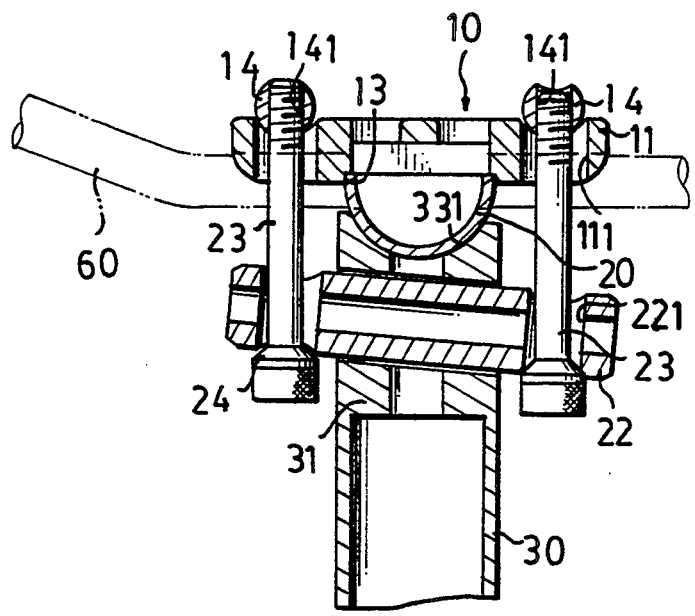
FIG. 3 is a cross-sectional side view of the bicycle seat adjusting assembly.

Referring now to FIGS. 1 through 5, and initially to FIGS. 1 through 3, a bicycle seat adjusting assembly in accordance with the present invention generally includes a seat tube 30 having a bore 32 extending transversely through an upper part 31 thereof which is recessed at an upper end thereof to form an arcuate surface 311, a balance tube 22 received in the transverse bore 32 with two ends thereof exposed outside the transverse bore 32, through each of which a vertical bore 221 is formed, and a mounting means for receiving supporting rods 60 which support the bicycle seat (not shown).

The mounting means includes a pivotal base 2C having an arcuate bottom surface pivotally received in the arcuate surface 311 and transverse recesses 21 formed in an upper side thereof. The mounting means further includes an upper cover 10 mounted on the pivotal base 20 and having transverse recesses 12 in alignment with associated recesses 21 to securely hold seat support rods 60 therebetween and two ears 11 each with a vertical hole 111 therein in alignment with the vertical bore 221. A groove 13 is formed in an underside of the upper cover to securely receive an upper side of the pivotal base 20.

A positioning block 14 is provided on each ear 11 and has a threaded hole 141 in alignment with the vertical hole 111. Preferably, the ear 11 is recessed to receive and retain associated positioning block 14. An adjusting bolt 23 passes through the vertical bore 221 and the vertical hole 111 to engage with the threaded hole 141. Preferably, a bearing bowl 24 is provided between each vertical bore 221 and associated adjusting bolt 23 in which the bearing bowl 24 includes a tapered surface 24a received in the vertical bore 221 and an annular wall 24b on which a head 23a of the adjusting bolt 23 abuts.

Figure 5:
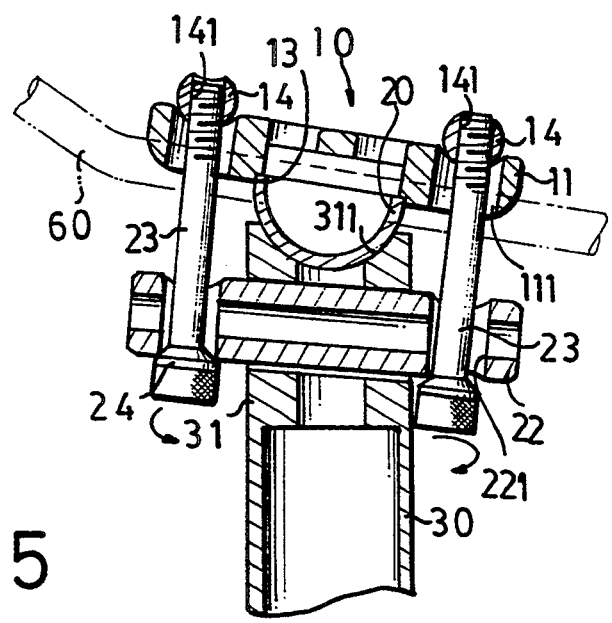
FIG. 5 is a cross-sectional view similar to FIG. 4, illustrating the adjustment of the position of the bicycle seat in an opposite direction.
Figure 4:
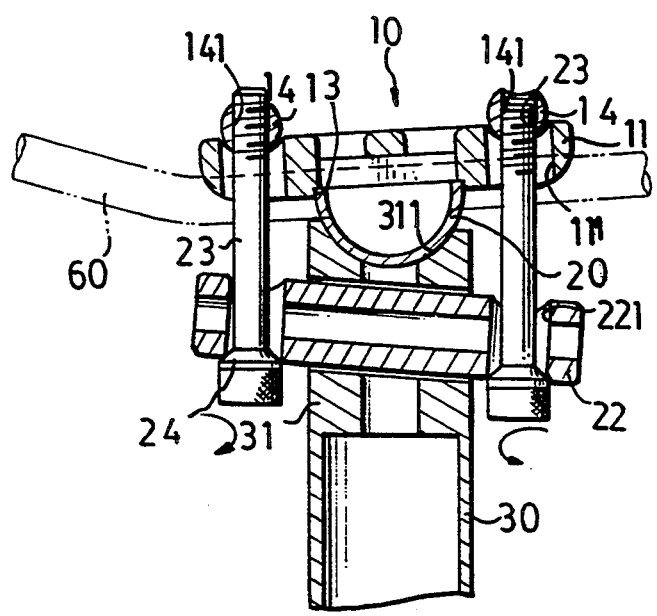
FIG. 4 is a cross-sectional view similar to FIG. 3, illustrating the adjustment of the position of the bicycle seat.

In operation, as shown in FIG. 4, if the user wishes the bicycle seat to incline leftward, he may firstly release the right adjusting bolt 23 and then tighten further the left adjusting bolt 23. Of course the user may simultaneously operate the two adjusting bolts 23 to achieve the same result. It is noted that as the positioning blocks 14 do not rotate in the recesses 112 of associated ears 11, the former exert a force on the upper cover 10 which, in turn, causes a pivotal motion of the mounting means (including the upper cover 10, the supporting rods 60, and the pivotal base 20) along the arcuate surface 311, thereby achieving the inclination adjustment of the bicycle seat. If the user wishes the bicycle seat to incline rightward, he may operate the adjusting bolts 23 in a direction opposite to that described in the above, i.e., he may release the left adjusting bolt 23 and screw the right adjusting bolt 23, as shown in FIG. 5.

Although the invention has been explained in relation to its preferred embodiment, it is to be understood that many other possible modifications and variations can be made without departing from the spirit and scope of the invention as hereinafter claimed.

I claim:

1. A bicycle seat adjusting assembly comprising:
   a seat tube (30) having a bore (32) extending transversely through an upper part (31) thereof, said upper part (31) having an arcuate surface (311) in an upper end thereof;
   a balance tube (22) received in said transverse bore (32) with two ends thereof exposed outside said transverse bore (32), a vertical bore (221) being formed in each said exposed end of said balance tube (22);
   a mounting means adapted to hold seat supporting rods (60), having an arcuate bottom surface pivotally received in said arcuate surface (311) and having two ears (11) each with a vertical hole (11) therein in alignment with one of said two vertical bores (221);
   a positioning block (14) mounted on each said ear (11) and having a threaded hole (141) in alignment with one of said two vertical holes (111); and
   a pair of adjusting bolts (23) each passing through one of said two vertical bores (221) and said aligned vertical hole (111) to engage with said aligned threaded hole (141).

2. The bicycle seat adjusting assembly as claimed in claim 1 wherein:
   Each of said adjusting bolts (23) includes a head (23a); and
   a bearing bowl (24) is provided between each said adjusting bolt (23) and said aligned vertical bore (221) in which said bearing bowl (24) includes a tapered surface (24a) received in said aligned vertical bore and an annular wall (24b) on which said head (23a) of said adjustable bolt (23) abuts.

3. The bicycle seat adjusting assembly as claimed in claim 1 wherein a thickness of a peripheral wall of said upper part (31) is greater than that of a lower part of said seat tube (30).

4. The bicycle seat adjusting assembly as claimed in claim 1 wherein each said ear (11) is recessed to retain one of said two positioning blocks (14).

5. A bicycle seat adjusting assembly comprising:
   a seat tube (30) having a bore (32) extending transversely through an upper part (31) thereof, said upper part (31) having an arcuate surface (311) in an upper end thereof;
   a balance tube (22) received in said transverse bore (32) with two ends thereof exposed outside said transverse bore (32), a vertical bore (221) being formed in each said exposed end of said balance tube (22);
   a pivotal base (20) having an arcuate bottom surface pivotally received in said arcuate surface (311) and transverse recesses (21) formed in an upper side thereof;
   an upper cover (10) mounted on said pivotal base (20) and having transverse recesses (12) in alignment with said recesses (21) in said pivotal base (20) adapted to securely hold bicycle seat support rods (60) therebetween and two ears (11) each with a vertical hole (111) therein in alignment with an associated one of said two vertical bores (221);
   a positioning block (14) mounted on each said ear (11) and having a threaded hole (141) in alignment with one of said two vertical holes (111);
   pair of adjusting bolts (23) each passing through one of said two vertical bores (221) and said aligned vertical hole (111) to engage with associated said threaded hole (141), said adjusting bolts (23) each including a head (23a); and
   a pair of bearing bowls (24) each including a tapered surface (24a) which is received in one of said two vertical bores (221) and an annular wall (24b) on which said head of said adjusting bolt (23) abuts.

6. The bicycle seat adjusting assembly as claimed in claim 5 wherein a thickness of a peripheral wall of said upper part (31) is greater than that of a lower part of said seat tube (30).

7. The bicycle seat adjusting assembly as claimed in claim 6 wherein each said ear (11) is recessed to retain one of said two positioning blocks (14).

8. The bicycle seat adjusting assembly as claimed in claim 6 wherein said upper cover includes a groove (13) in an underside thereof to securely receive an upper side of said pivotal base (20).

* * * * *